United States Patent [19]

Joslyn

[11] 4,294,285
[45] Oct. 13, 1981

[54] MULTI-PORT VALVE

[76] Inventor: Larry J. Joslyn, 720 Wilkinson Rd., Macedon, N.Y. 14502

[21] Appl. No.: 969,534

[22] Filed: Dec. 14, 1978

[51] Int. Cl.³ .............................................. F17D 3/01
[52] U.S. Cl. ........................... 137/625.11; 137/614.16
[58] Field of Search ...................... 137/614.16, 614.17, 137/614.18, 625.11, 625.16, 625.41, 625.47

[56] References Cited

U.S. PATENT DOCUMENTS

| | | | |
|---|---|---|---|
| 360,594 | 4/1887 | Ide | 137/625.68 |
| 1,070,896 | 8/1913 | Hughes | 137/637.3 |
| 1,458,355 | 6/1923 | Nelson | 137/637.3 |
| 1,968,390 | 7/1934 | Hamilton | 137/627 |
| 2,335,085 | 11/1943 | Roberts | 137/625.47 |
| 2,645,450 | 7/1953 | Chessman | 137/625.68 |
| 2,700,984 | 2/1955 | Gleasman | 137/614.17 |
| 2,858,851 | 11/1958 | Holl | 137/625.48 |
| 3,048,675 | 8/1962 | Olson | 137/625.46 |
| 3,535,874 | 10/1970 | Smith | 137/625.47 |
| 3,625,255 | 12/1971 | Genin | 137/625.41 |
| 3,742,979 | 7/1973 | Woodling | 137/625.47 |
| 3,892,259 | 7/1975 | McClocklin | 137/625.46 |

*Primary Examiner*—Gerald Goldberg
*Assistant Examiner*—Denis E. Corr
*Attorney, Agent, or Firm*—Schovee & Boston

[57] ABSTRACT

A multiport valve has a valve member which is moved so as to place the valve inlet into communication with a selected one of several valve outlets, there being a control member between the valve member and valve outlet which prevents flow from any intermediate valve outlet that may be traversed by the valve member as it moves to the selected outlet.

5 Claims, 10 Drawing Figures

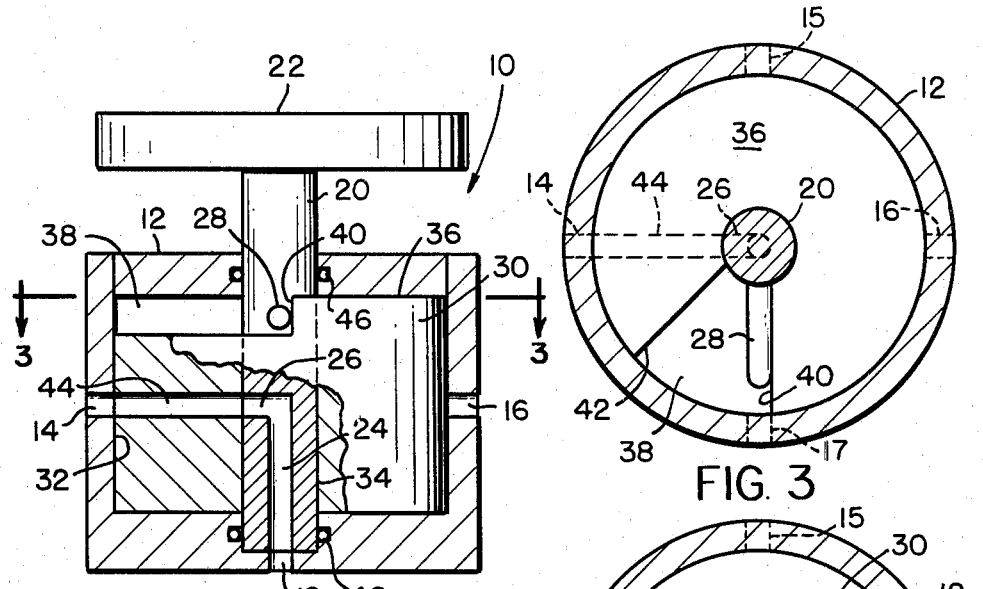
FIG. 1
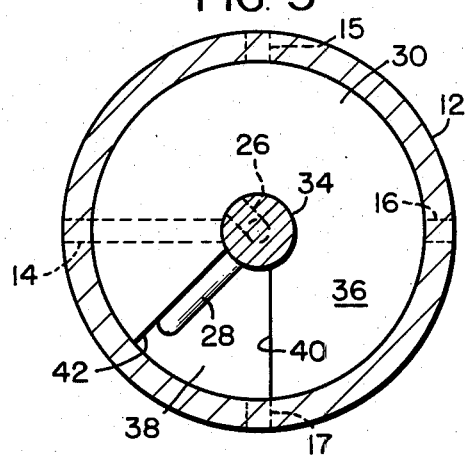
FIG. 3
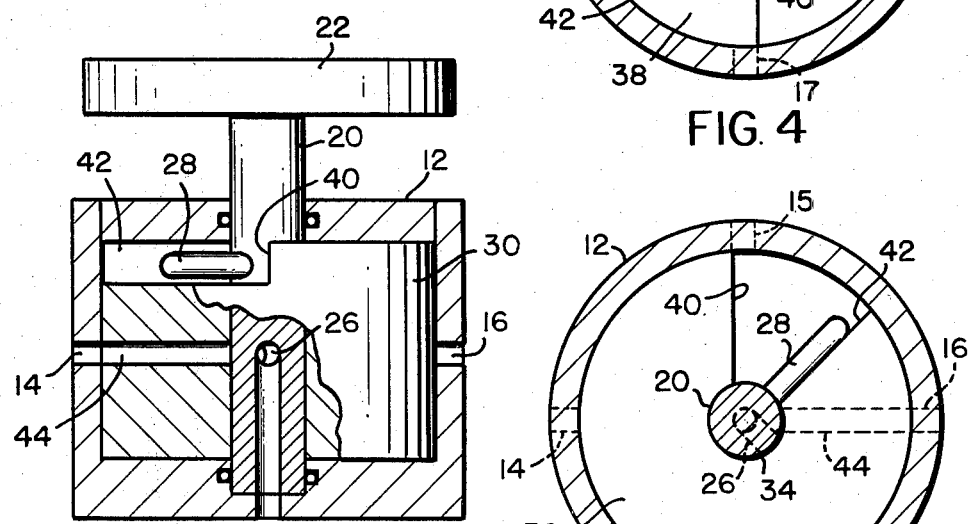
FIG. 2
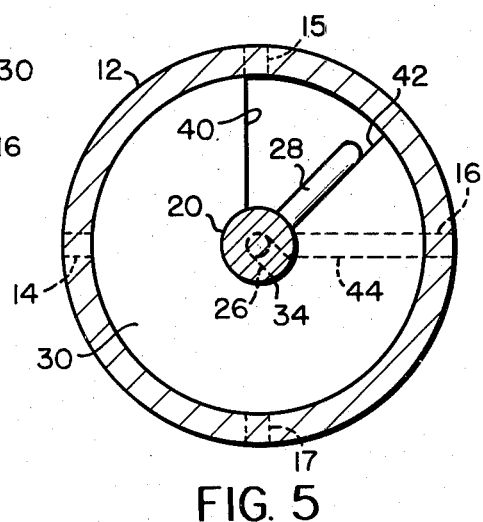
FIG. 4
FIG. 5

MULTI-PORT VALVE

TECHNICAL FIELD

The present invention relates generally to multi-port valves and more particularly to such a valve using a disc, plug or the like to direct flow through the valve to one or another of several outlets. Once characteristic of presently available valves of this type is that movement of a plug to change the flow path from one outlet to another results in an undesired flow from some intermediate outlet. In this respect, if the plug must traverse a valve outlet while moving to the selected outlet, there is a momentary communication and consequently some flow from the intermediate outlet as the plug traverses this outlet in moving to the selected outlet. This problem, of course, can be solved by having a cut-off valve in the fluid supply to the multi-port valve. Operation of the cut-off will then terminate flow to the multi-port valve as the plug is being recycled to direct flow from one outlet to another. However, this arrangement requires a separate valve structure remote from the multi-port valve.

SUMMARY OF THE INVENTION

In the present invention, the problem is solved by providing a member within the multi-port valve which seals the outlet of the disc or plug automatically whenever the plug is cycled and maintains this seal until after the outlet of the disc or plug is brought into registry with the desired valve outlet.

DESCRIPTION OF THE DRAWINGS

FIG. 1 is a elevation view partly broken away and in section showing a multi-port valve of the present invention;

FIG. 2 is a view similar to FIG. 1 only showing the valve in the position wherein flow is terminated;

FIGS. 3–5 are views taken along line 3-3 of FIG. 1 showing the valve in various operating positions;

DESCRIPTION OF THE INVENTION

Figure 6:
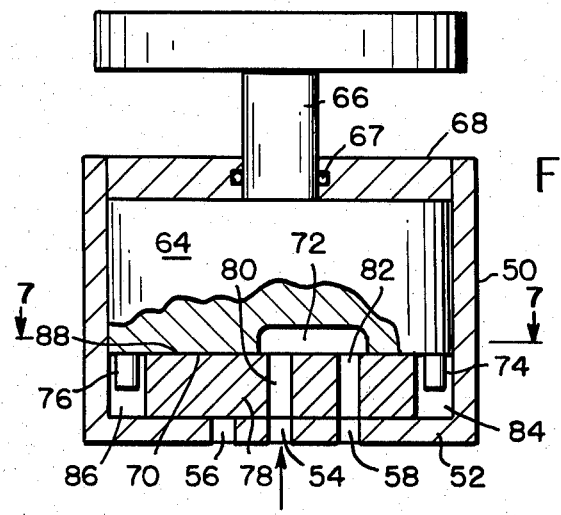
FIG. 6 is a view similar to FIG. 1 showing another embodiment of the valve.

Referring to the drawings, FIG. 1 shows one embodiment of the invention wherein the multi-port valve is generally indicated at 10. This valve has a housing 12 with at least 3 fluid outlets, two of the outlets being identified by the references 14 and 16 and at least one outlet 15 or 17 (FIG. 3) being intermediate or between outlets 14 and 16. The housing also has a fluid inlet 18. It is understood that the inlet and outlets are all provided with suitable fixtures (not shown) for connection to fluid flow lines or the like.

Extending into housing 12 is a movable valve body which in the embodiment shown is a valve plug 20. This plug is rotatable with respect to the housing by any suitable means, such as a handle 22. The plug has a axial bore 24 extending for a portion of its length, this bore being in communication at one end with housing inlet 18 and terminating at its other end in a radially extending port 26. Completing the structure of plug 20 is a pin 28 which extends radially from the surface of the plug as best seen in FIG. 2.

Disposed within valve housing 12 and surrounding plug 20 is a sleeve or control member 30. Sleeve 30 is movable with respect to both housing 12 and plug member 20, with the sleevehousing interface 32 and the sleeve-plug interface 34 being fluid tight. The upper end surface 36 of sleeve 30 is provided with a cut out or recessed portion 38 wherein the upright walls 40, 42 (FIG. 3) of the recess act as limits or stops for pin 28 as set out hereinbelow.

Extending radially through sleeve 30 is a fluid passage 44. Fluid passage 44 is adapted to provide communication between port 26 of plug 20 and one or the other of housing outlets 14–17 as shown, for example, in FIG. 1.

Completing the structure of multi-port valve 10 are appropriate seal members as may be necessary such as O-rings 46, 48 which prevent leakage of fluid through the housing from about plug 20.

The operation of multi-port valve 10 will be described assuming it is initially in the position as shown in FIG. 1. In this position, fluid from an appropriate source (not shown) enters valve housing 12 through inlet 18. The fluid flows through plug bore 24, port 26, sleeve passage 44 and leaves the housing through outlet 14. This identical arrangement of the valve components is shown in plan view in FIG. 3. When it is desired to transfer fluid flow from housing outlet 14 to housing outlet 16 without discharging fluid from an intermediate housing outlet 15 or 17 (FIG. 3), the valve is operated in the following manner.

From the position shown in FIGS. 1 and 3, the handle 22 is rotated clockwise until pin 28 engages the sleeve surface or stop 42 as shown in FIGS. 2 and 4. This rotation of plug 20 carries port 26 out of registration with sleeve passage 44, so that port 26 is now sealed by the sleeve-plug interface 34 (FIG. 4).

Since pin 28 is engaged against sleeve surface 42 continued rotation of handle 22 in a clockwise direction will now move sleeve 30 in a clockwise direction. As sleeve 30 rotates clockwise, sleeve passage 44 is carried past housing outlet 15. However, there is no fluid from housing outlet 15 because the port 26 is closed by the sleeve-plug interface 34. Continued clockwise rotation of handle 22 eventually brings sleeve passage 44 into registry with housing outlet 16 as shown in FIG. 5. However, because port 26 is still sealed by the sleeve-plug interface 34 there is still no flow from valve housing 12. Once sleeve passage 44 is registered with housing outlet 16, handle 22 is moved counterclockwise. Such movement allows sleeve 30 to remain in position while plug 20 is being rotated so as to bring port 26 into registry with sleeve passage 44. Once the communication between port 26 and passage 44 is re-established, fluid will flow from housing outlet 16.

Thus, the construction and operation of the valve described hereinabove will prevent the undesired flow of fluid from any outlet (14, 15, 16 or 17) of the valve, while the valve is being cycled to redirect flow from one selected outlet to another. While operation has been described in terms of handle 22 being rotated clockwise, it is apparent that counterclockwise operation is also possible with the valve as shown in FIGS. 1–5 resulting in sequential registration and communication of the inlet 18 with the outlets 14, 17, 16 and 15. Additionally, while the sleeve 30 is in registry with any one of the outlet ports 14, 15, 16 or 17, the plug 30 can be rotated clockwise out of registry with the sleeve 30 and counterclockwise in registry with the sleeve 30 resulting in off/on control of the fluid path from inlet 18.

Figure 7:
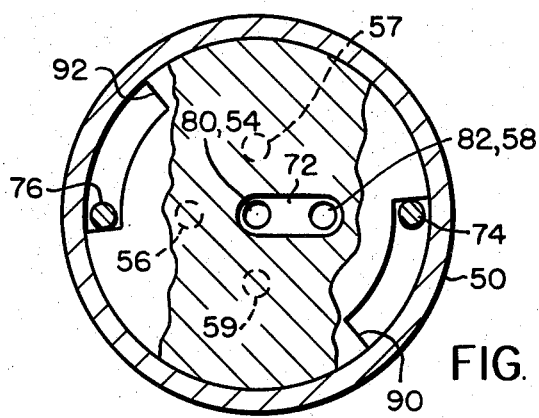
FIGS. 7–9 are views broken away and in section along lines 7-7 of FIG. 6 showing the valve in various operating positions.

Turning now to FIG. 6, another embodiment of the valve is shown wherein the valve housing is identified by the reference numeral 50. One end wall 52 of the housing contains a centrally located fluid inlet 54. This same end wall 52 contains at least three fluid outlets 56, 57, 58 and 59. Each of the fluid outlets extend parallel to the fluid inlet 54 and lie on the periphery of an imaginary circle having inlet port 54 as its center (FIG. 7).

Disposed within the housing 50 is a valve, movable valve body which in the embodiment shown is a cylinder 64. This valve cylinder may be rotated by any suitable means such as a shaft 66 extending through an end wall 68 of the housing which is opposite the end wall containing the fluid inlets and outlets. Any suitable means such as O-ring 67 may be used to seal between the housing 50 and shaft 66 to prevent leakage of fluid therefrom. The lower end face 70 of the cylinder (as viewed in FIG. 6) is provided with an elongated recessed portion 72. The length of recessed portion 72 is slightly greater than the radius of an imaginary circle encompassing the fluid outlets 56–59 while the width of the recessed portion is slightly greater than the diameter of the fluid inlet 54 and outlets 56–59 as shown for example in FIG. 7.

Completing the structure of cylinder 64 are two pins 74, 76 which extend from the lower face 70 of the cylinder adjacent the periphery thereof.

Figure 10:
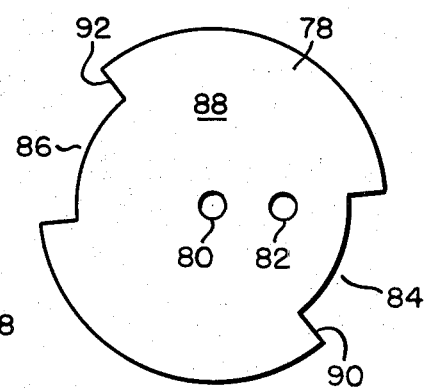
FIG. 10 is a plan view of one valve element.

Interposed between the lower end face 70 of the cylinder and the end wall 52 of the valve housing is a flow control disc 78. As best shown in the plan view of FIG. 10, flow control disc 78 is generally circular. Extending through disc 78 is a centrally located fluid inlet passage 80 and a radially spaced fluid outlet passage 82. The inlet and outlet passages of the disc are located to coincide respectively with the housing fluid inlet 54 and a housing fluid outlet 56, 57, 58 or 59 as shown for example in FIG. 6. Disc 78 is provided with diametrically opposed cut-out portions 84 and 86 at its periphery which are adapted to receive pins 74 and 76 of the cylinder for purposes set out hereinbelow.

With the arrangement of the valve components as shown in FIGS. 6 and 7, fluid enters the valve housing through inlet 54 and leaves through fluid outlet 58. The communication between inlet 54 and outlet 58 is provided by passage 80 in the flow control disc, recessed portion 72 in the end face of cylinder 64 and passage 82 in the flow control disc.

Figure 8:
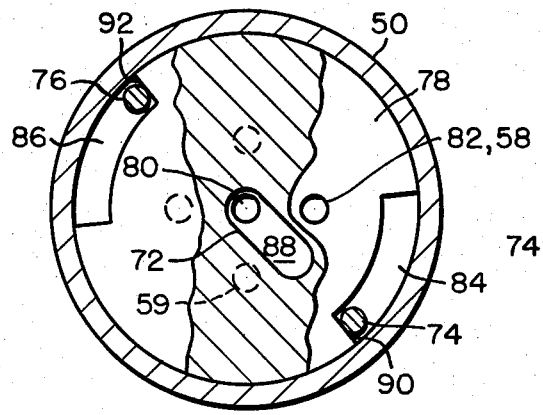

Redirecting flow of fluid from outlet 58 to outlet 56 without having fluid flow from one of the intermediate outlets 57 or 59 is accomplished in the following manner. Cylinder 64 is rotated clockwise to the position shown in FIG. 8. While the cylinder is being rotated to this position, flow control disc 78 does not move as pins 74, 76 merely travel across the cut-out portions 84, 86 of the disc. Rotating cylinder 64 to the position shown in FIG. 8 removes the cylinder recessed portion 72 from communication with the flow control disc outlet passage 82 so that the volume defined by cylinder recessed portion 72 and the upper surface 88 of the flow control disc is a closed volume from which fluid cannot escape. Continued rotation of cylinder 64 in a clockwise direction brings pins 74, 76 into engagement with the end surface 90, 92 respectively of the disc cut-out portions 84, 86. Thereafter, continued rotation of cylinder 64 in a clockwise direction will cause both the cylinder and the flow control disc 78 to move as a unit in a clockwise direction maintaining the closed volume formed by the cylinder recessed 72 and the surface 88 of the flow control disc as set out hereinabove.

As the rotation of the cylinder and disc continue, the disc outlet passage 82 will be carried into registry with fluid outlet 59 of the housing. However, no fluid will flow since the volume formed by the cylinder recessed portion 72 and the surface 88 of the disc remains sealed as set out hereinabove.

Figure 9:
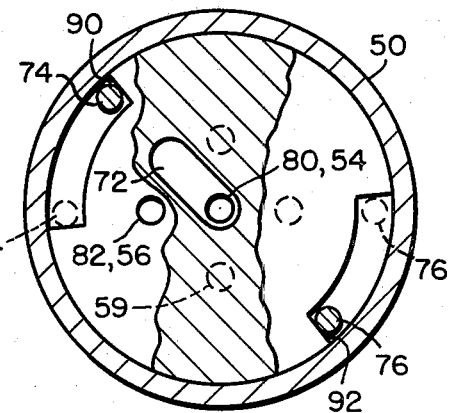

Rotation of the cylinder and the disc now continues until disc passage 82 is brought into registry with the housing outlet 56 as shown in FIG. 9. In this position there is no flow from housing outlet 56 until cylinder 64 is rotated counterclockwise so as to bring cylinder recessed portion 72 into registry with the disc outlet 82 as represented by the dotted line position of pins 74, 76. It is only then that a fluid path is established consisting of housing inlet 54, disc passage 80, cylinder recessed portion 72, disc passage 82 and housing outlet 56.

Thus, it should be appreciated that the valve as shown in the embodiment described above provides a valve structure which like the embodiment of FIGS. 1–5 allows a valve to be cycled to one of several valve outlets without leaking fluid from some intermediate valve outlet that is traversed when moving from one selected outlet to another.

While the valves of both embodiments have been described as having a single inlet with a plurality of outlets, it should be appreciated that flow could be reversed. In this respect, the valve could have several inlets with one fluid outlet wherein the valve is operated to direct fluid from one of several inlets to a single outlet.

Also, it should be appreciated that rather than first moving plug 20 (FIG. 1) or cylinder 64 (FIG. 6) with the sleeve 30 and flow control disc 78 following such movement, it is within the skill of the art to have the sleeve or disc move first with the movement of the plug 20 or cylinder 64 following such movement.

Having thus described the invention in detail, what is claimed as new is:

1. A multi-port valve comprising:
 (a) a valve housing having an end wall containing at least three fluid outlets and a fluid inlet and said fluid outlets all being spaced apart from each other and being located equi-distant from said fluid inlet;
 (b) a cylindrical, rotatably movable valve body positioned in said valve housing, said valve body containing a fluid inlet and a fluid outlet located in one end face thereof and being spaced apart from each other and being in fluid communication with each other, said fluid inlet of said valve body being located on the rotational axis of said valve body; and said fluid inlet of said valve housing also being located on rotational axis of said valve body;
 (c) a rotatably movable flow control disc positioned in said housing and located intermediate said one end face of said valve body and said end wall of said valve housing and being in fluid tight contact with said end face and end wall, respectively, and being axially aligned with said cylindrical rotatably movable valve body, said flow control disc including an inlet fluid passage and an outlet fluid passage extending therethrough, said fluid passages being spaced apart from each other the same distance said fluid inlet of said valve housing is spaced apart from each of said fluid outlets of said valve housing, said fluid inlet passage being located on the rotational axis of said valve body and of said flow control disc and being in-line with and in fluid communication with both said fluid inlet of said valve housing and said fluid inlet of said valve body at all relative rotational positions of said valve body and said flow control disc;

(d) means connected to said rotatably movable valve body for rotating said valve body relative to said valve housing and relative to said flow control disc, said valve body and said flow control disc cooperating with each other such that said body can move relative to said disc between a first position wherein said body fluid outlet is in fluid communication with said disc outlet passage, and a second position wherein said body fluid outlet is sealed from said disc outlet passage; and (e) drive means cooperatively interengageable between said valve body and said flow control disc, after said valve body has moved to said second position, for rotatably moving said flow control disc together as a unit with said valve body and relative to said housing, as rotation of said valve body is continued, whereby said fluid outlet passage of said flow control disc can be placed in registry with a selected one of said housing fluid outlets, and the flow of fluid therefrom is accomplished only after said valve body is moved, relative to said disc, back to said first position to place said valve body fluid outlet, said disc outlet and said selected housing outlet into registry.

2. The multi-port valve of claim 1, wherein said fluid inlet and said fluid outlet of said valve body are connected by an elongated groove in said one end face of said valve body.

3. The multi-port valve of claim 1, wherein the periphery of said flow control disc has a cut-out portion and said valve body includes a pin extending axially from said one end face thereof into said cut-out portion, whereby said valve body is adapted to move with respect to said housing and disc between said first and second positions as said pin travels from one end of said cut-out portion to another, the engagement of said pin against an end of said cutout portion comprising said drive means to move said valve body and disc together as a unit with respect to said housing.

4. The multi-port valve of claim 1 wherein said valve housing encloses a cylindrical chamber, and wherein the periphery of both said valve body and said flow control disc are in fluid tight contact with an inside wall of said chamber, and wherein said housing end wall is a flat wall.

5. The multi-port valve of claim 4 wherein said housing includes a second flat end wall on the opposite end of said housing from said first end wall, and wherein said rotating means comprises a shaft extending axially through said second end wall, and a seal between said shaft and second end wall.

* * * * *

UNITED STATES PATENT AND TRADEMARK OFFICE
CERTIFICATE OF CORRECTION

PATENT NO. : 4,294,285
DATED : October 13, 1981
INVENTOR(S) : Larry J. Joslyn

It is certified that error appears in the above—identified patent and that said Letters Patent is hereby corrected as shown below:

Claim 1(a), line 2, after "inlet", insert ---extending through said end wall,---.

Signed and Sealed this

Twenty-second Day of December 1981

|SEAL|

Attest:

GERALD J. MOSSINGHOFF

Attesting Officer     Commissioner of Patents and Trademarks